United States Patent
Xue et al.

(10) Patent No.: US 10,250,053 B2
(45) Date of Patent: Apr. 2, 2019

(54) OPTIMAL BATTERY CURRENT WAVEFORM FOR BIDIRECTIONAL PHEV BATTERY CHARGER

(71) Applicants: Lingxiao Xue, Blacksburg, VA (US); Paolo Mattavelli, Padua (IT); Dushan Boroyevich, Blacksburg, VA (US)

(72) Inventors: Lingxiao Xue, Blacksburg, VA (US); Paolo Mattavelli, Padua (IT); Dushan Boroyevich, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 315 days.

(21) Appl. No.: 14/971,611

(22) Filed: Dec. 16, 2015

(65) Prior Publication Data
US 2016/0172877 A1    Jun. 16, 2016

Related U.S. Application Data

(60) Provisional application No. 62/092,324, filed on Dec. 16, 2014.

(51) Int. Cl.
*H02J 7/00* (2006.01)
*H02J 7/02* (2016.01)
*H02M 7/797* (2006.01)

(52) U.S. Cl.
CPC .......... *H02J 7/0052* (2013.01); *H02J 7/022* (2013.01); *H02M 7/797* (2013.01)

(58) Field of Classification Search
CPC ......... H02J 7/0052; H02J 7/022; H02M 7/797

USPC ........................................................ 320/145
See application file for complete search history.

(56) References Cited

U.S. PATENT DOCUMENTS

| | | | |
|---|---|---|---|
| 2007/0080659 A1* | 4/2007 | Urakabe | H02M 7/48 318/599 |
| 2008/0062724 A1* | 3/2008 | Feng | H02J 7/35 363/17 |
| 2013/0335026 A1* | 12/2013 | Reynolds | H02J 7/0016 320/112 |
| 2015/0229235 A1* | 8/2015 | Underhill | H02M 1/4216 363/89 |

OTHER PUBLICATIONS

Ruxi, et al.; "A High power Density Single-Phase PWM Rectifier with Active Ripple Energy Storage"; Power Electronics, IEEE Transactions on, vol. 26, No. 5; pp. 1430-1443; 2011.
Whitaker et al; "A High-Density, High-Efficiency, Isolated On-Board Vehicle Battery Charger Utilizing Silicon Carbide Power Devices;" Power Electronics, IEEE Transaction on; vol. PP, No. 99, pp. 1-1, 2013.

(Continued)

*Primary Examiner* — Nathaniel Pelton
(74) *Attorney, Agent, or Firm* — Keith A. Vogt; Vogt IP

(57) ABSTRACT

The present invention provides a battery charger and battery charging method controlled with a charging waveform input of an AC-DC switching circuit to a DC link and a DC-DC stage converter for outputting a regulated DC voltage. The method determining the charging waveform comprising the steps of selecting a Pulse Width Modulation (PWM) zero-off charging waveform signal input to the AC-DC switching circuit and calculating a ripple power at the DC link based on the signal input power and output power of the regulated DC voltage output.

6 Claims, 12 Drawing Sheets

(56) References Cited

OTHER PUBLICATIONS

Dong, et al; "Two-stage single phase bi-directional pwm power converter with dc link capacitor reduction," ed: Google Patents, 2012.

Wang, et al.; "Electrical power system with high-density pulse width modulated (PWM) rectifier" ed: Google Patents; 2013.

Balog Jr., et al; "Methods for minimizing double-frequency ripple power in single-phase power conditioners," et: Google Patents, 2010.

Uno et al; "Influence of High-Frequency Charge– Discharge Cycling Induced by Cell Voltage Equalizers on the Life Performance of Lithium-Ion Cells," Vehicular Technololgy, IEEE Transactions on, vol. 60, No. 4; 1505-1515, 2011.

Bala, "The Effect of Low Frequency Current Ripple on the Performance of a Lithium Iron Phosphate (LFP) battery energy storage system," in Proc. Energy Conversion Congress and Exposition (ECCE), 2012 IEEE, Sep. 15-20, 2012 Year, pp. 2485-3492.

Tae-Hoon et al; "Analytical study on low-frequency ripple effect of battery charging" in Proc. Vehicle Power and Propulsion Conference (VPPC), 2012 IEEE, Oct. 9-12, 2012 Year, pp. 809-811.

Beh et al; "Effects of pulse and DC charging on lithium iron phosphate (LiFePO$_4$) batteries," in Proc. Energy Conversion Congress and Exposition (ECCE), 2013 IEEE, Sep. 15-19, 2013 Year, pp. 315-320.

Lee et al; "Electrochemical State Based Sinusoidal Ripple Current Charging Control," Power Electrnoics, IEEE Transactions on, vol. PP, No. 99, pp. 1-1, 2014.

Lingxiao et al;, "Dual active bridge based battery charger for plug-in hybrid electric vehicle with charging current containing low frequency ripple," in Proc. Applied Power Electronics Conference and Exposition (APEC), 2013 Twenty-Eights Annual IEEE, Mar. 17-21, 2013 Year, pp. 1920-1925.

Dedoncker et al; "Power conversion apparatus for DC/DC conversion using dual active bridges," ed Google Patents, 1991.

Everts et al; "Optimal ZVS Modulation of Single-Phase single-Stage Bidirectional DAB AC–DC Converts," Power Electronics, IEEE Transactions on, vol. 29, No. 8; pp. 3954-3970, 2014.

\* cited by examiner

OPTIMAL BATTERY CURRENT WAVEFORM FOR BIDIRECTIONAL PHEV BATTERY CHARGER

RELATED APPLICATIONS

This application claims the benefit of U.S. Provisional Application No. 62/092,324 filed on Dec. 16, 2014 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Single phase AC/DC converter with power factor correction has an issue of pulsating input power at double line frequency. This pulsating power usually is stored in an intermediate capacitor if output power is DC. The required capacitance, depending on the ripple power at double line frequency, will result in either a short lifetime with electrolytic capacitors or high volume with film capacitors. Especially when wide bandgap semiconductors have been used to shrink other passive components significantly, the DC link capacitor becomes one major power density barrier.

In some applications, such as automobile and aviation electronics, both long lifetime and high power density are required, therefore some efforts have been made to address this issue. Given the same ripple energy, capacitance is reduced by enlarging the capacitor voltage ripple. This concept can be implemented directly to the DC link capacitor, as shown in a grid-interface bi-directional converter, which increases device voltage stress and the capacitance reduction is limited due to the range limitation of DC link voltage swing. Alternatively, it can be implemented in the auxiliary capacitors, but the realization is more complicated and expensive.

Recent research from Lithium-Ion batteries shows that a charging current with two times the line frequency ripple causes no harm to the battery at least in the short term. Therefore, proposed charger designs with the charging current containing low frequency ripples, so the DC link capacitance can be significantly reduced.

However, with sinusoidal charging, the switches usually suffer from hard-switching, at least at the valley of the charging current for most charger topologies, unless other components are added to produce a smooth current/voltage transitions at the switching moment. Therefore, the overall efficiency under this condition is impacted. An example of the charger topology is shown in FIG. 1, which is comprised of a full-bridge AC/DC stage plus a dual active bridge DC/DC stage. The DAB topology is advantageous in terms of fixed frequency, soft-switching and symmetrical configuration for bi-directional power flow. Advanced DAB modulation for an extended zero-voltage switching range has been intensively investigated, but the scheme is very complicated.

BRIEF SUMMARY OF THE INVENTION

In one embodiment, the present invention concerns a high density, high efficiency and long lifetime power converter, which may interface with a single-phase AC voltage connected to an energy storage device. This converter may be either unidirectional or bidirectional. In the power converter, the charging or discharging current of the energy storage device is controlled to contain a certain amount of double-line-frequency ripple, which may be synchronized to the AC voltage. In this way, the DC link capacitance can be reduced and high power density can be achieved. Furthermore, reduction of DC link capacitance also enables using one or more long-lifetime capacitors.

In one embodiment, the present invention provides charging waveforms that minimize converter loss.

In another embodiment, the present invention provides an optimal charging (discharging) waveform that may reduce DC link capacitance by more than 62%.

In yet other embodiments, the present invention provides a number of different charging waveforms, including reduced-ripple sinusoidal charging, cut-ripple sinusoidal charging, reduced-ripple square wave charging, square-wave-zero-off charging and PWM-square-wave-zero-off charging, to achieve better trade-off between DC link energy storage requirements and converter efficiency.

In several preferred embodiments, the present invention uses square wave or PWM charging waveforms that provide even great converter loss savings by shutting down the DAB at the zero part of the charging current or when the is delivering no power.

In yet another preferred embodiment, the present invention provides a PWM-zero-off charging waveform that reduces DC link capacitance by 65% while only increasing converter loss by 10%, by optimizing the duty cycle. An optimized duty cycle is approximately 0.627 or may be 0.627.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Figure 1:
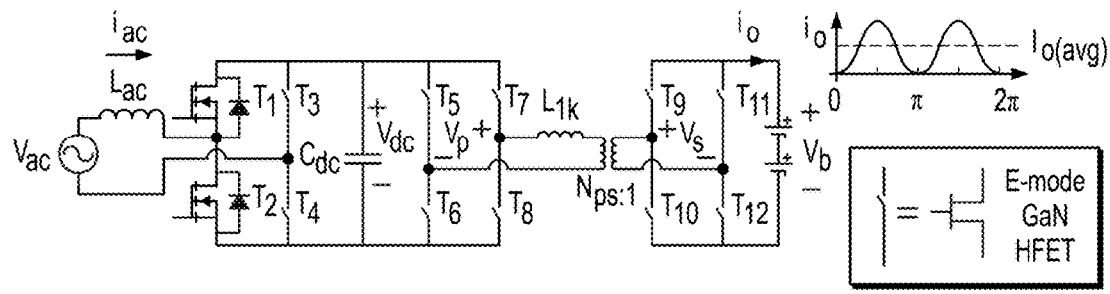
FIG. 1 illustrates a battery charger topology for an embodiment of the present invention having a Full Bridge (FB) AC-DC stage plus a Dual Active Bridge (DAB) DC-DC stage. The charging current is sinusoidal and both a DC component and an AC component are at double line frequency.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention The present invention, for exemplary purposes, provides an analysis uses the charging power flow as an example but the present invention also applies to power flow from energy storage to the AC side.

A single phase rectifier in a PHEV battery charger requires substantial unity power in the factor at the input. Therefore, in normal operating conditions, the input power is in the form of $$p_{in}(t) = V_{ac}I_{ac} - V_{ac}I_{ac}\cos(2\omega t) = P_{in} + p_{in\_rip}(t) \quad (1)$$

where $p_{in}(t)$ is the instantaneous input power at the AC input. $V_{ac}$ and $I_{ac}$ are the RMS value of the AC side voltage and current, respectively, and $\omega$ is the line frequency in rad/s. Thus, the input power has both DC and double line frequency components. In conventional charging methods, the output of the battery charger provides only DC power. Consider a lossless condition, then $$p_{o(dc)}(t) = P_{in} \quad (2)$$

The DC component of the input power balances with the output power. However, the ripple power oscillates at two times the line frequency and should be stored in passive components between the AC source and the DC output. In most cases, an intermediate bulk capacitor is used as the storage device. As a result, the voltage ripple across the DC link capacitor will be $$\Delta V_{dc} = \frac{V_{ac}I_{ac}}{\omega \cdot C_{dc} \cdot V_{dc}} \quad (3)$$

In contrast, the output power of a sinusoidal charging in a lossless condition is described as $$p_{o(sin)}(t) = I_{o(avg)}V_{bat} - I_{o(avg)}V_{bat}\cos(2\omega t) = p_{in}(t) \quad (4)$$

where $V_b$ is the battery voltage and $I_{o(avg)}$ is the average value of the battery charging current. With perfect balance between input power and output power, there is no remaining ripple power that needs to be stored. Therefore, the DC link voltage ripple will be zero:

$$\Delta V_{dc} = 0 \quad (5)$$

Sinusoidal charging represents the extent to which the DC link voltage ripple may be suppressed. As a result, the DC charging waveform, together with all other charging waveforms, will always have an imbalanced ripple power. Thus, the DC link voltage ripple at double line frequency cannot be fully eliminated, even theoretically.

Ideally, sinusoidal charging may significantly reduce the requirements of DC link capacitance. However, the converter efficiency will be impacted. The main impact appears on the efficiency of the DC/DC stage since the AC/DC stage always deals with the same format of power regardless of charging current waveforms, as long as power factor correction and DC voltage regulation are guaranteed.

There are two types of mechanism that makes the DC/DC stage more lossy during sinusoidal charging: conduction loss and switching loss. As a result, sinusoidal charging at the DC/DC stage needs to process not only the DC power but also the ripple power at double line frequency. This increases the RMS value of the current through any semiconductor switches and transformer windings. Therefore, it can be expected that the conduction loss of the DC/DC stage will be higher.

Figure 2:
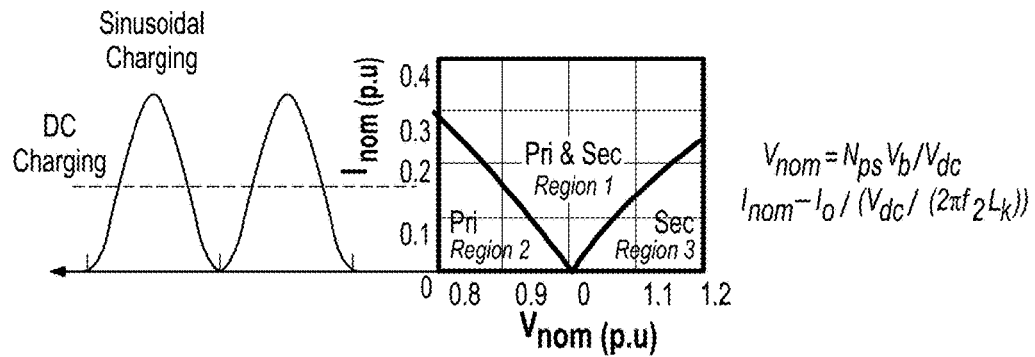
FIG. 2 illustrates a DAB ZVS boundary with phase shift modulation for an embodiment of the present invention.

Since the charging current will change from zero to two times the average value, it is more difficult to optimize the converter to achieve zero voltage switching. For the dual active bridge converter of an embodiment of the present invention, the ZVS boundary, with phase shift modulation, is illustrated in FIG. 2 if the parasitic capacitances and inductances are ignored. The closer the charging current approaches zero, the easier the DAB loses ZVS for power switches. When the normalized voltage equals to one, the DAB has the widest ZVS range regarding output current. In practice, at very low current, the DAB inductor current is too low to discharge the parasitic capacitances of switches and any transformer, thereby it is inevitable that hard-switching will occur.

Sinusoidal charging shows higher loss compared to DC charging as a result of increased conduction loss and switching loss. While DC charging may provide improved efficiency, a large DC link capacitor is needed, which is not needed with sinusoidal charging. Therefore, the two charging waveforms stay in two extremes in the trade-off between DC link voltage ripple (or DC link capacitance) and charger loss (or charger efficiency). In certain embodiments, the present invention achieves an improved balance between the two charging schemes.

A charging current may be in any arbitrary waveform, if it fulfils the following principle: 1) The average current equals to the value required by the charging profile. 2) The double line frequency component of the waveform is in phase with the input ripple power. The first principle makes sure the charging profile is enforced. Thus, deploying different charging waveforms will only mean that different AC components need to be used, including a double line frequency component. The second principle requires that the output ripple power cancel the input ripple power so as to reduce the DC link energy storage requirement.

Given an arbitrary charging current $i_o(t)$, the output power $p_o(t)$ will show a similar form because the battery voltage is a DC value. Following principles 1 and 2, the output power can be written in the form of $$p_o(t) = P_o + p_{o\_rip}(t) \quad (6)$$

The ripple power stored in the DC link capacitor is determined by the difference between input power and output power:

$$p_{cap\_rip}(t) = p_{in}(t) - p_o(t) = p_{in\_rip}(t) - p_{o\_rip}(t) \quad (7)$$

The energy stored in the DC link capacitor can therefore be obtained by integrating the ripple power as $$E_{cap}(t) = E_{con} + E_{cap\_rip}(t) = E_{con} + \int_0^t p_{cap\_rip}(t) \cdot dt \quad (8)$$

Where $E_{con}$ and $E_{con\_rip}(t)$ represent the DC and ripple component of the capacitor energy, respectively. Then the instantaneous DC link voltage should satisfy $$\frac{1}{2} C_{dc} \cdot v_{dc}(t)^2 = E_{cap}(t) \quad (9)$$

Assuming the DC link voltage will be regulated to $V_{dc}$, then we have $$V_{dc} = \frac{1}{T} \int_0^T v_{dc}(t) \cdot dt \quad (10)$$

In which T is the period of DC link voltage. By substituting (7), (8) and (9) into (10), the only unknown variable $E_{con}$ can be solved, and then the DC link voltage expression with respect to time can be obtained. It should be noticed that given arbitrary charging current waveforms in (6), the solving process may involve a group of transcendental equations, therefore only numerical solutions are possible. To make a first guess on $E_{con}$, $0.5 C_{dc} V_{ac}^2$ may be a reasonable choice because physical meaning implies that the real solution should be close to this value. However, these two values do not strictly equal each other, especially when the voltage ripple is high in amplitude. This point may be understood by expanding $v_{dc}(t)$ in (9) into its DC and ripple components, which yields $$E_{cap}(t) = \frac{1}{2} C_{dc} \cdot [V_{dc} + v_{dc\_rip}(t)]^2 = \\ \frac{1}{2} C_{dc} \cdot V_{dc}^2 + \frac{1}{2} C_{dc} \cdot v_{dc\_rip}(t)^2 + \frac{1}{2} C_{dc} \cdot 2 \cdot V_{dc} \cdot v_{dc\_rip}(t) \quad (11)$$

The second item at the right side of (11) can also contribute to the DC component, meaning $E_{con}$ does not equal to $0.5 C_{dc} V_{ac}^2$. For example, apparently the ripple voltage will have double line frequency components, the square of this trigonometric function will produce DC.

Figure 3:
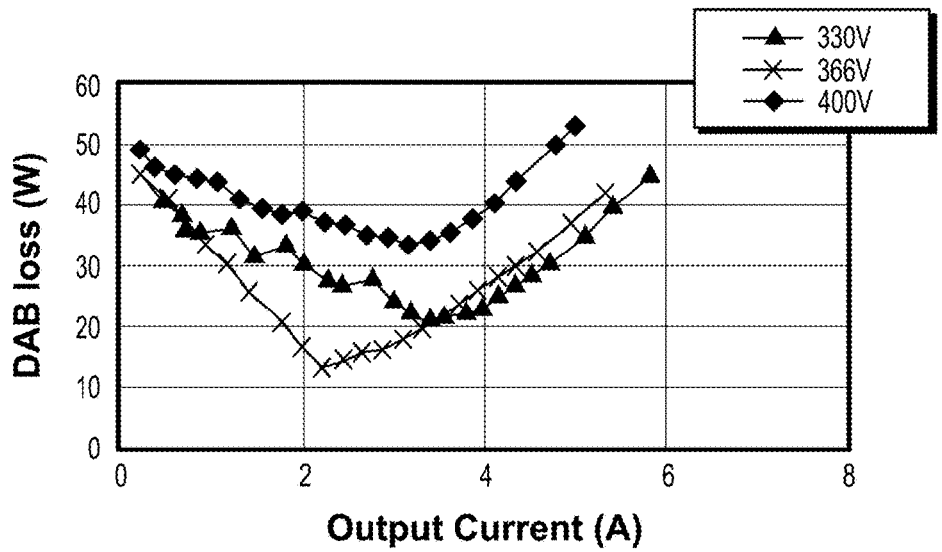
FIG. 3 illustrates a DAB loss measurement at different output (charging) currents and battery voltages, namely, 330V, 366V and 400V for an embodiment of the present invention.

To evaluate the converter loss, the present invention measures converter loss at different DC charging currents and battery voltage settings. FIG. 3 provides loss measurement results for a Si MOSFET-based battery charger. FIG. 3 shows that as output current increases, DAB losses first reduces then increases. This may result from starting at a certain current level, zero-voltage-switching can be achieved. After that point, higher current will introduce more ohmic loss. At different battery voltages, different "corner" current values may be observed. This indicates there are different ZVS boundaries, as shown in FIG. 2. It is also clear that at 400V, there is a higher loss than at 330V and 366V.

Based on this data and curve-fitting the DAB loss as $p_{loss}(I_o, V_b)$, the converter loss with an arbitrary charging current waveform may be predicted by $$P_{loss}(V_b) = \frac{1}{T}\int_0^T p_{loss}[i_o(t), V_b] \cdot dt \qquad (12)$$

Although the charging current waveforms may be in any shape, patterns which may potentially achieve a better trade-off between voltage ripple and converter loss are preferred. In the examples provided below, different charging current waveforms are provided for several preferred embodiments of the present invention.

Figure 4A:
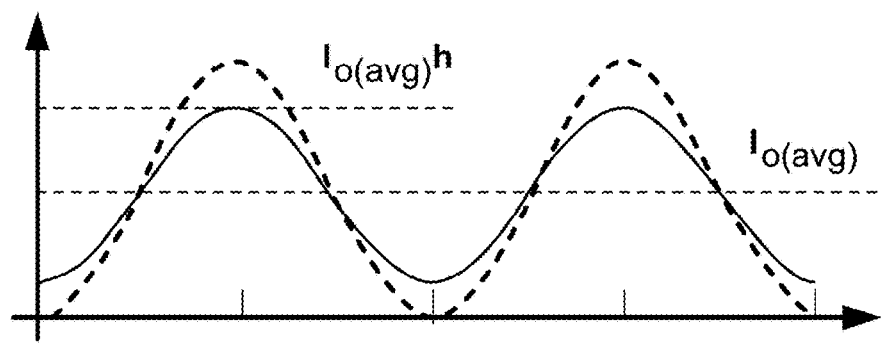
FIGS. 4A, 4B and 4C illustrate reduced ripple charging schemes for several embodiments of the present invention. (A) Reduced-ripple sinusoidal charging. (B) Cut-ripple sinusoidal charging. (C) Reduced-ripple square wave charging. The dashed lines show the sinusoidal charging current waveform. All waveforms may have the same average value and the double line frequency component should be in phase with the input ripple power.

The above analysis of sinusoidal charging shows that the increased loss is caused by a large ripple, leading to both a high RMS current and higher switching losses. Accordingly, in one embodiment that improves efficiency, the present invention reduces the ripple amplitude of the sinusoidal charging waveform while incurring a penalty of increased ripple power at double line frequency in the DC link capacitor as shown in FIG. 4A. Compared to conventional sinusoidal charging, this embodiment only reduces the ripple amplitude and the charging current pattern is defined as $$i_{o(red-rip)}(t) = I_{o(avg)} - h \cdot I_{o(avg)} \cos(2\omega t) \qquad (13)$$

in which h is the ripple index, defined as the ratio of ripple amplitude to the average value:

$$h = I_{rip}/I_{o(avg)} \qquad (14)$$

The value range of h is from 0 to 1. When h equals to zero, this charging scheme collapses to DC charging; when h equals to 1, this charging scheme becomes conventional sinusoidal charging.

Figure 4B:
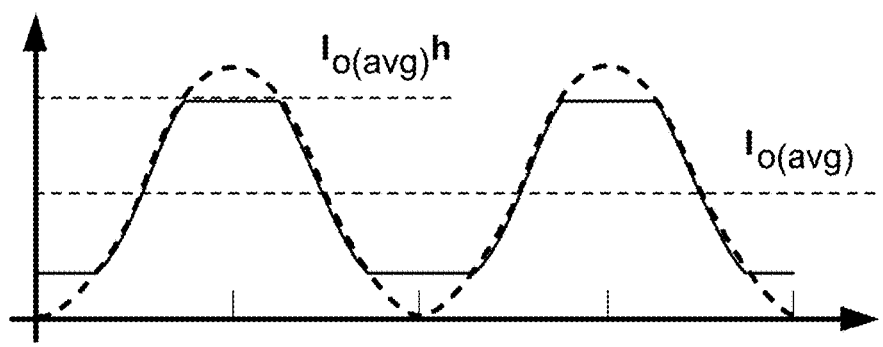

In another embodiment, the present invention provides a cut-ripple sinusoidal charging scheme, as shown in FIG. 4B. In this embodiment, most parts of the current waveform follow the sinusoidal charging scheme, except that the ripple peak and valley are clipped at two fixed values. Therefore, the definition would be $$i_{o(cut-rip)}(t) = \begin{cases} I_{o(avg)} - h \cdot I_{o(avg)} & \text{if } \frac{I_{o(avg)} - I_{o(avg)}\cos(2\omega t) <}{I_{o(avg)} - h \cdot I_{o(avg)}} \\ I_{o(avg)} + h \cdot I_{o(avg)} & \text{if } \frac{I_{o(avg)} - I_{o(avg)}\cos(2\omega t) >}{I_{o(avg)} + h \cdot I_{o(avg)}} \\ I_{o(avg)} - I_{o(avg)}\cos(2\omega t) & \text{otherwise} \end{cases} \qquad (15)$$

Compared to the reduced-ripple sinusoidal charging, for the same h, this embodiment will cause less imbalance between input and output power due to a smaller area difference from the conventional sinusoidal charging, as shown in FIG. 4B.

Figure 4C:
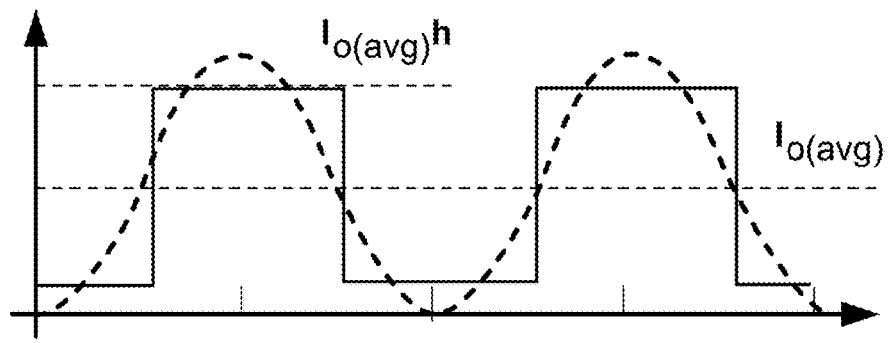

Another embodiment of the present invention is reduced-ripple square wave charging, as shown in FIG. 4C. The definition is $$i_{o(red-sq)}(t) = \begin{cases} I_{o(avg)} + h \cdot I_{o(avg)} & \text{if } \frac{1}{2}\pi < 2\omega t < \frac{3}{2}\pi \\ I_{o(avg)} - h \cdot I_{o(avg)} & \text{otherwise} \end{cases} \qquad (16)$$

All three of the above described embodiments collapse to DC charging when the ripple index h drops to zero.

Figure 5A:
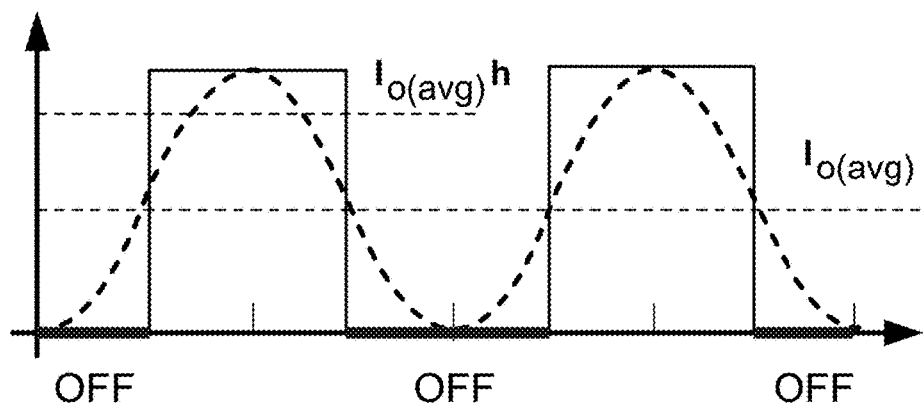
FIGS. 5A-5B illustrate charging schemes with DAB turned-off when the charging current is zero for several embodiments of the present invention. (A) Square-zero-off charging. (B) PWM-zero-off charging. The dashed lines show the sinusoidal charging current waveform. All waveforms should have the same average value and the double line frequency component should be in phase with little input ripple power

In yet another embodiment of the present invention, square-off charging is provided as shown in FIG. 5A. Reduced-ripple square wave charging becomes full square wave charging if h=1. As a result, for this embodiment, the lower part of the charging current waveform will be zero, and accordingly, the embodiment shuts down the DAB stage at the lower part. The square-off charging current can be described as $$i_{o(sq-off)}(t) = \begin{cases} 2I_{o(avg)} & \text{if } \frac{1}{2}\pi < 2\omega t < \frac{3}{2}\pi \\ 0 & \text{otherwise} \end{cases} \qquad (17)$$

By shutting down the DAB stage at the zero current interval, the converter reduces energy loss. Otherwise, the DAB converter will only be circulating energy, causing loss without delivering power to the load. The main drawback of the square-off charging is that whenever the output current changes according to charging profile, the high level current needs to be adjusted accordingly.

Figure 5B:
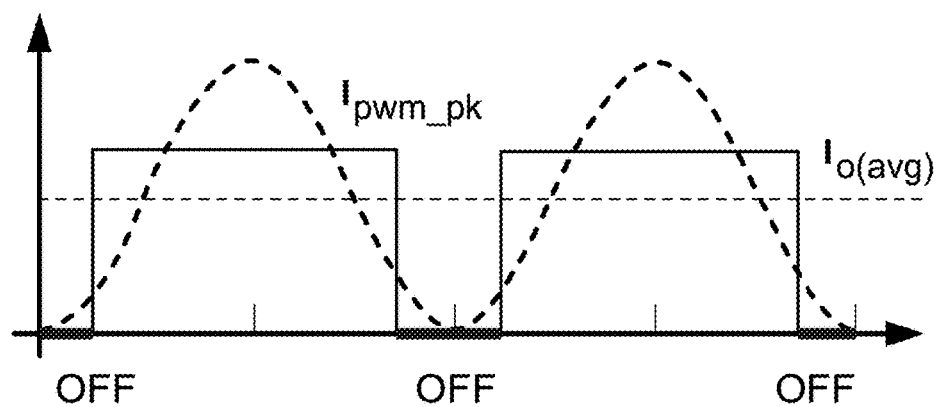
Figure 6A:
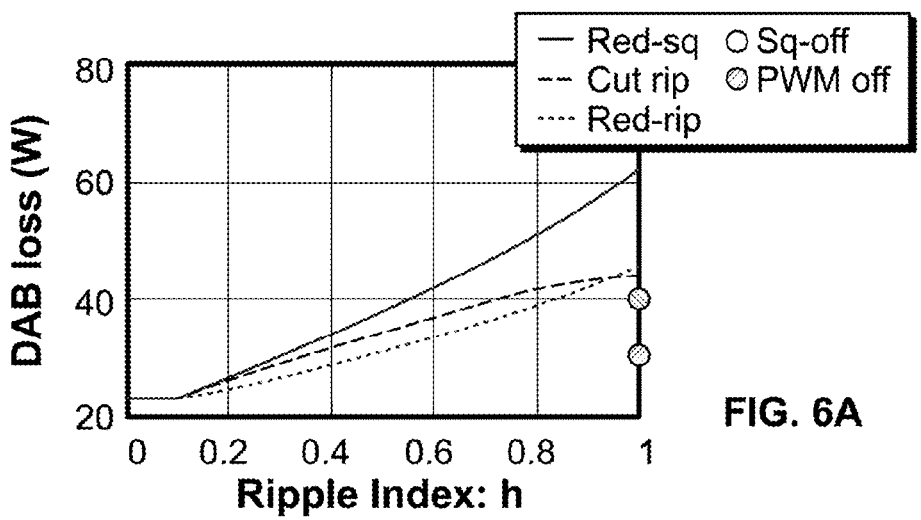
FIGS. 6A, 6B and 6C illustrate DAB loss evaluation results with different charging waveforms and different battery voltages for several embodiments of the present invention. Test condition: 400 V input. 1.26 kW output power, 511 kHz switching frequency. (A) Battery voltage is 330V. (B) Battery voltage is 366V. (C) Battery voltage is 400V. Losses in all reduced-ripple charging schemes are plotted with respect to ripple index. Zero-off charging schemes are plotted only at h=1 because they are only possible with full ripple.
Figure 6B:
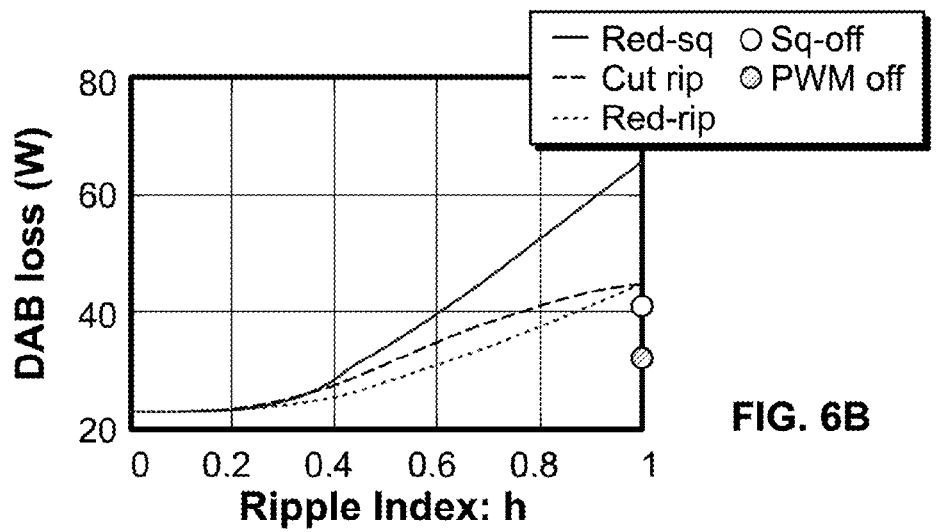
Figure 6C:
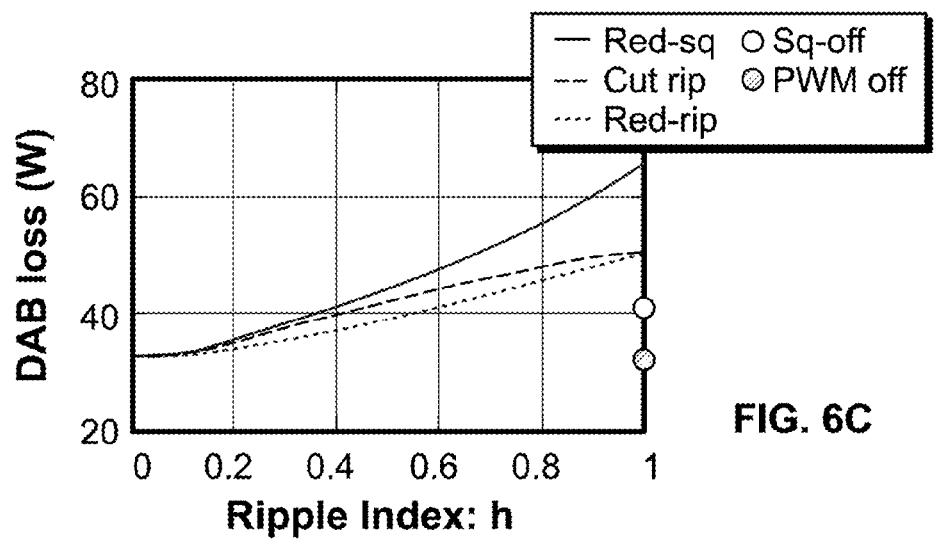

In yet another embodiment, the present invention improves upon square-off charging with Pulse Width Modulation (PWM)-off charging as shown in FIG. 5B. This scheme keeps the high level of the current constant but only adjust the pulse width of the wave to achieve a different average value. This waveform is defined as $$i_{o(pwm-off)}(t) = \begin{cases} I_{pwm\_pk} & \text{if } \left(1 - \frac{I_{o(avg)}}{I_{pwm\_pk}}\right)\pi < 2\omega t < \left(1 + \frac{I_{o(avg)}}{I_{pwm\_pk}}\right)\pi \\ 0 & \text{otherwise} \end{cases} \qquad (18)$$

With the methods explained above, DAB loss can be predicted at different charging schemes, different ripple indexes, and different battery voltages. Based on the above, with an increasing ripple index, all reduced-ripple charging schemes show higher converter loss which falls into a comparison between DC charging and sinusoidal charging. Specifically, reduced-ripple and cut-ripple charging collapse to DC charging when h=0 and to sinusoidal charging when h=1. This is also a reason why their curves merge at both ends. Reduced-square wave charging also becomes DC charging when h=0, therefore it also merges with the other two reduced-ripple charging schemes. It can also be seen that the reduced-square wave charging scheme results in a lossy converter at a high ripple index, mainly because of both an increased RMS current value and switching loss at the zero current part of the waveform.

By shutting down the DAB stage at the zero current part of the waveform, the loss of the square-off embodiment (designated as the sq-off dot in the figures) drops below all the reduced-ripple counterparts. The PWM-off scheme of the present invention may achieve an even lower converter loss mainly because of reduced conduction loss.

By using the ripple voltage analysis method described above, FIGS. 7A and 7B plot the typical DC link voltage waveforms for different charging schemes. Note that reduced-ripple charging uses h=0.6 as an example.

Figure 7A:
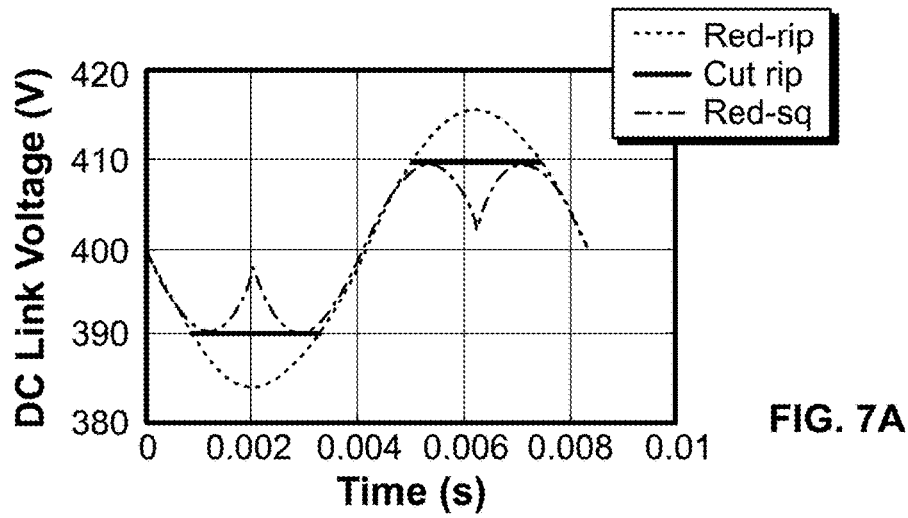
FIGS. 7A and 7B illustrate DC link voltage ripple waveforms assuming 400V DC bus, 366V battery voltage, 106 μF capacitance and 1.26 kW power for several embodiments of the present invention. (A) Reduced-ripple charging at h=0.6, including reduced-ripple charging, cut-ripple charging and reduced-square wave charging. (B) Zero-off charging including square-wave-off charging and PWM-off charging.
Figure 7B:
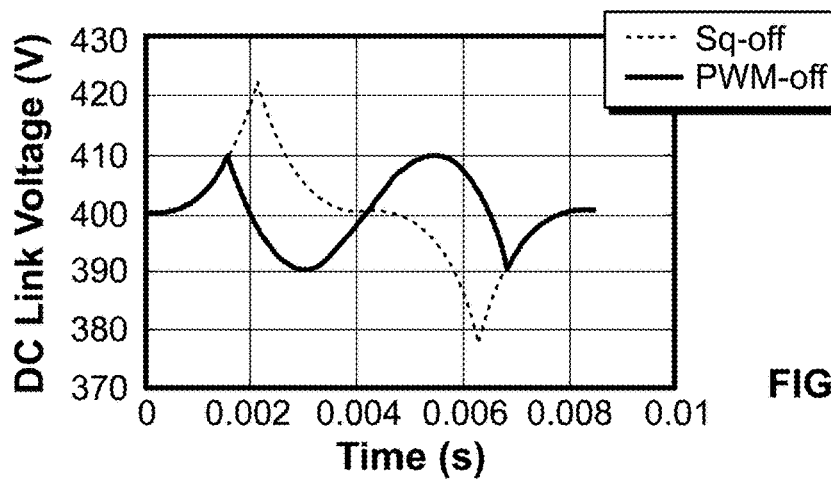
Figure 8A:
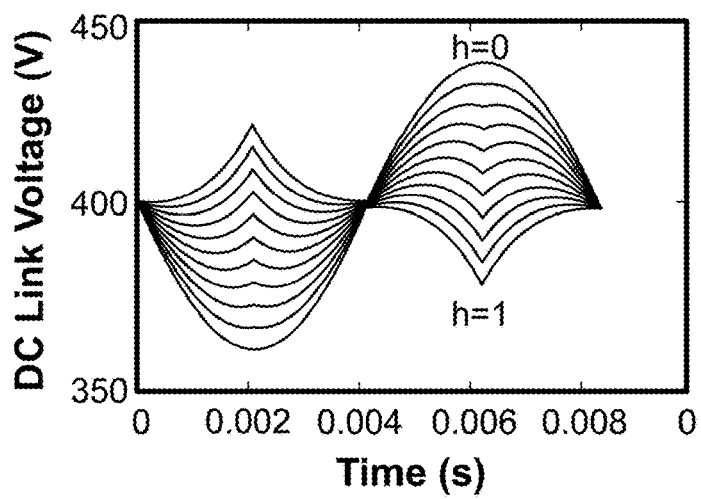
FIGS. 8A, 8B and 8C show an analysis of DC link voltage ripple for square-wave charging and PWM-off charging for several embodiments of the present invention. (A) DC link voltage waveforms of reduced-ripple square-wave charging at different ripple indexes. (B) Charging current with PWM-off charging, reduced-ripple square-wave charging and conventional sinusoidal charging. (C) Current difference between sinusoidal charging current and the PWM-off charging current, together with the ripple energy.

FIG. 7A shows that the voltage ripple, designated as red-rip, is a sinusoidal wave because of the charging current only have DC and double line frequency components. In contrast, the voltage ripple, designated as cut-rip, has a flat top and bottom, reflecting the output current shape. The sq-off voltage ripple, as shown in FIG. 7B, should have the same waveform as red-sq at h=1. It can be seen that the ripple voltage behaves only as a single peak and valley, and the ripple amplitude becomes the highest among all five methods. By plotting the group of DC link voltage ripple waveforms at different ripple index h, the comparison can be clearly observed, as shown in FIG. 8A. It may be seen that the minimum DC link voltage ripple is neither at h=0 nor h=1, but sits in between the two ends.

Figure 8B:
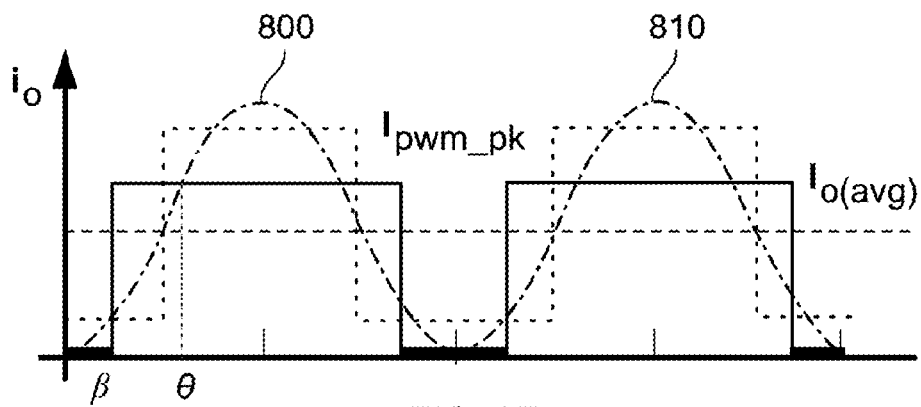

The reason for this can be explained in FIG. 8B. The DC link voltage waveform is determined by the ripple power waveform in the capacitor, which further relies on the difference between the charging power and input power. As shown in FIG. 8B, the sinusoidal charging current waveform in dashed line 800 is exactly the one that can fully compensate the input ripple power. Any difference between the investigated charging current and that sinusoidal charging waveform will result in imbalanced ripple power, and cause DC link voltage ripple.

With reduced-ripple square-wave charging, shown as dashed line 810 in FIG. 8B, the square wave current intersects with the sinusoidal current for six times in one period, instead of two times for reduced-ripple sinusoidal charging and four times of cut-sinusoidal charging. More intersections break the difference between the two waveforms into more areas, creating multiple peaks and valleys in the DC link voltage waveforms, and thus reduce the peak-to-peak voltage ripple at some optimal points. The phenomena become weaker when ripple index approaches to 0 or 1, thereby the ripple becomes bigger. At either h=0 or h=1, there are only two intersections, so the benefit is lost.

In yet a further embodiment, it is desirable to not use square-wave charging except at h=1 where DAB-zero-off operation is possible, otherwise loss will be too high. But the above analysis also applies to the PWM-off charging. As shown in FIG. 8B, the similar phenomenon of six-times-intersection also exists. To determine the optimal condition to achieve the minimum DC link voltage ripple for PWM-zero-off charging, the duty cycle of the PWM-zero-off charging may be defined as $$D = I_{o(avg)}/I_{pwm\_pk} \quad (18)$$

Then the instant $\beta$ is determined by $$\beta = \pi(1-D) \quad (19)$$

The instant $\theta$ when the two waveform intersects should satisfy $$I_{pwm\_pk} = I_{o(avg)} - I_{o(avg)} \cos(\theta) \quad (20)$$

Figure 8C:
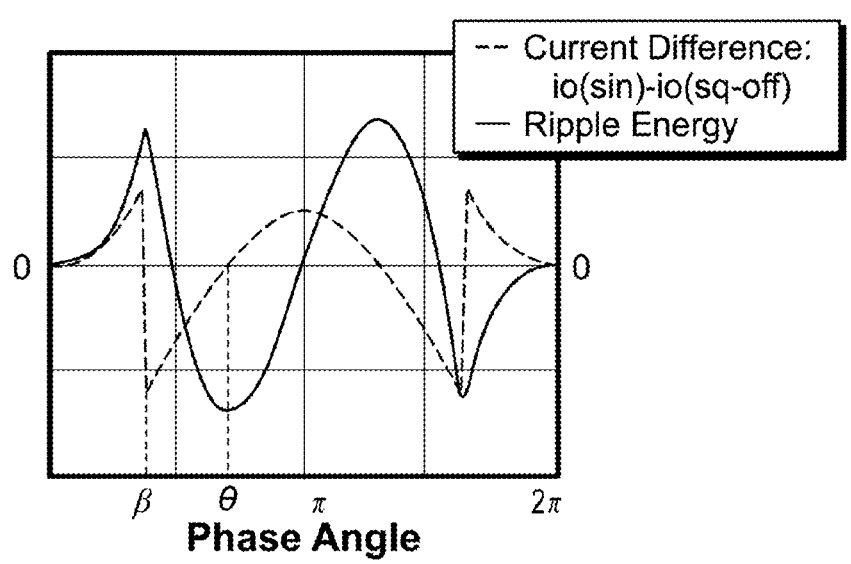

In FIG. 8B and FIG. 8C, from instant 0 to $\beta$, the Sin wave is larger than the PWM wave, therefore the ripple energy will keep integrating until instant $\beta$ when an energy valley is reached. From $\beta$ to $\theta$, since the Sin wave turns out to be lower than the PWM wave, the ripple energy, as a result of integral, will increase to a peak at instant $\theta$. To minimize the DC link voltage ripple, the present invention makes $$\int_0^\beta (i_{o(sin)} - i_{o(pwm-off)}) \cdot d\alpha = -\int_0^\theta (i_{o(sin)} - i_{o(pwm-off)}) \cdot d\alpha \quad (21)$$

so that the ripple energy has the same amplitude but opposite signs at instant $\beta$ to $\theta$. Numerical solution can be found for equation groups (18) to (21), which yields an optimal duty cycle of $$D_{opt} = 0.627 \quad (22)$$

Figure 9:
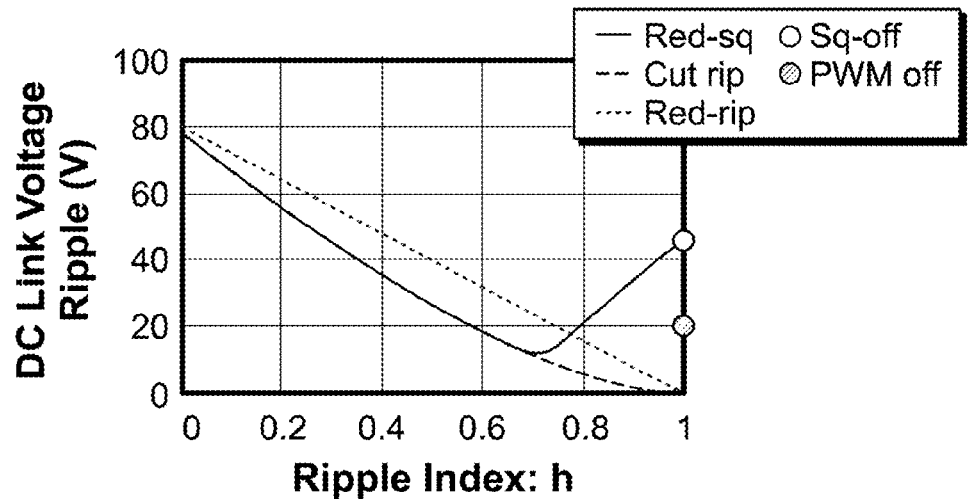
FIG. 9 illustrates peak-to-peak ripple of the DC link voltage at different ripple indexes and charging schemes. Conditions: 400V DC bus, 106 μF capacitance and 1.26 kW power. The results are applied to different battery voltages, including 330V, 366V and 400V.
Figure 14:
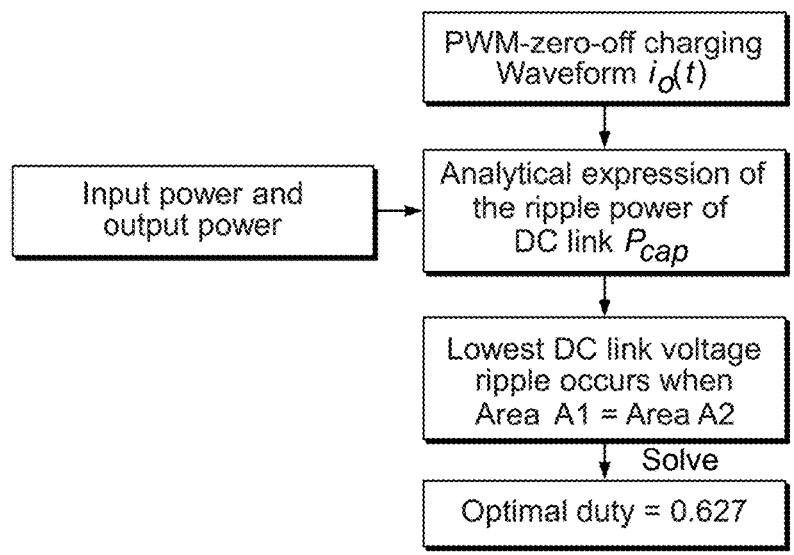
FIG. 14 shows a methodology to determine the optimal duty cycle for PWM-zero-off charging.

Thus, for preferred embodiment of the present invention, keeping the duty cycle around and/or at 0.627 for the PWM-off charging, the DC link voltage ripple can be minimized. Based on this assumption, the peak-to-peak DC link voltage ripple can be estimated. The results are plotted in FIG. 9 where the curves are for 1.26 kW output power, regardless the battery voltage, because the ripple power is directly determined by output power, instead of battery voltage. It is expected that with larger ripple indexes, both reduced-ripple and cut-ripple sinusoidal charging will result in lower ripple. FIG. 14 shows how the duty cycle of 0.627 is derived.

When h=1, the voltage ripple will be zero because the ripple power is fully balanced. Reduced-ripple square-wave exhibits a "U" shape curve with the change of ripple index, as explained above. Square-off charging shows the same voltage ripple as the reduced-ripple square wave charging when h=1. Since PWM-off charging uses optimal duty cycle, it shows a lower ripple than Square-off charging scheme.

Two battery chargers were tested, one Si charger and one GaN charger, in using the above disclosed embodiments of the present invention. The entire charger was tested including the AC/DC stage and DAB stage, to verify both converter overall losses and DC link voltage ripple.

The test conditions for the Si charger and GaN charger are summarized in Table 1. The test results of the Si charger are summarized in FIGS. 10A-10C. The DC link voltage ripple is plotted with respect to the charger total loss to provide a comparison of the trade-off between the two parameters. As shown, the PWM-off charging scheme stays at the left-lower corner of the map, showing the best overall performance. The benefits of this preferred embodiment become more apparent at 330V and 400V battery voltage. The charger is most efficient at around 366V because the transformer turns ratio is 1.1:1, which makes the DAB have the widest ZVS range at this voltage. In all three cases, the voltage ripple for PWM-zero-off charging is around 28V while DC charging is around 80V, demonstrating that the embodiment reduces DC capacitance by 65%, while the loss increase in the worst case is 10% from 57 W to 63 W, as shown in FIG. 10B.

TABLE 1

Test condition of the Si charger and GaN charger

| Si charger | | GaN charger | |
| --- | --- | --- | --- |
| AC voltage (V) | 240 | AC voltage (V) | 90 |
| DC link voltage (V) | 400 | DC link voltage (V) | 150 |
| Battery voltage (V) | 330~400 | Battery voltage (V) | 120~180 |
| Output power (W) | 1260 | Output power (W) | 300 |
| Switching frequency (kHz) | 50 | Switching frequency (kHz) | 500 |
| Transformer turns ratio | 1.1:1 | Transformer turns ratio | 1:1 |
| DC link capacitance (μF) | 106 | DC link capacitance | 100 |

Figure 10A:
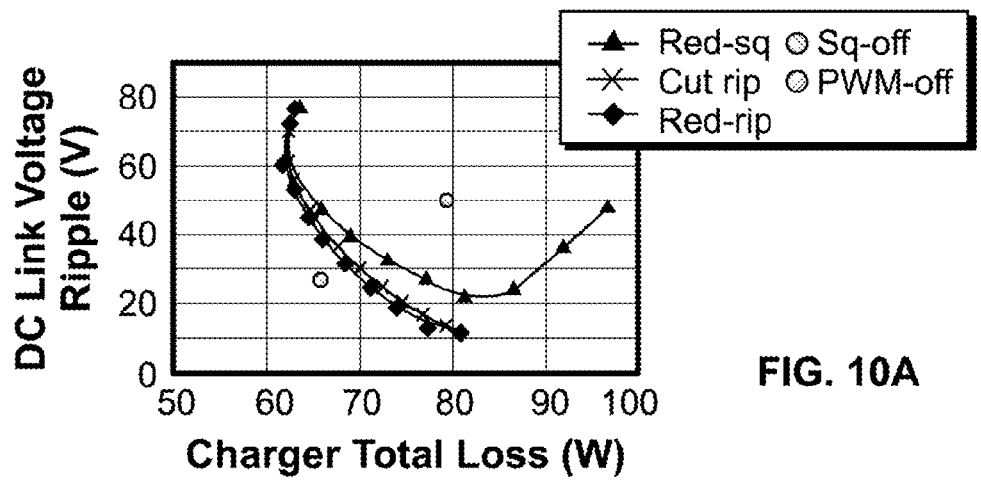
FIGS. 10A, 10B and 10C: Si charger DC link voltage ripple versus charger total loss for several embodiments of the present invention. (A) Battery voltage is 330V. (B) Battery voltage is 366V. (C) Battery voltage is 400V. Data points at the lower-left corner give better overall performance.
Figure 10B:
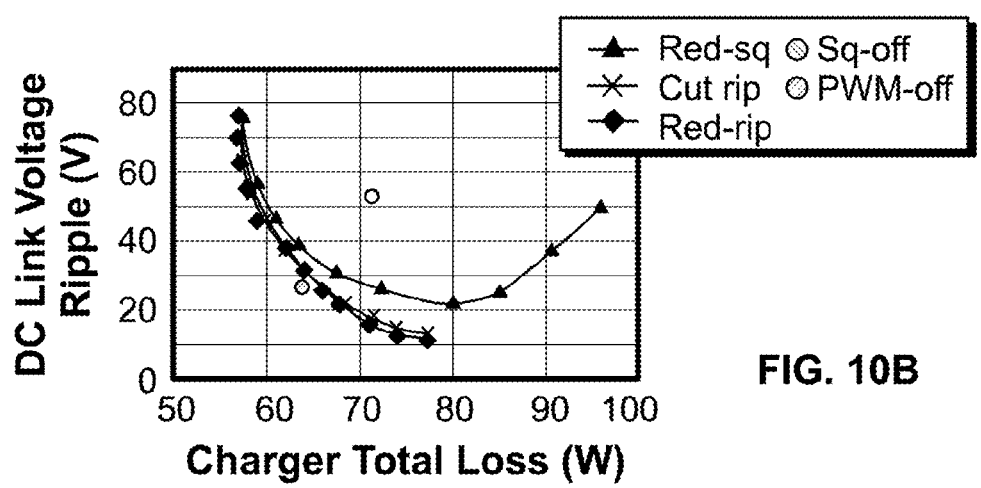
Figure 10C:
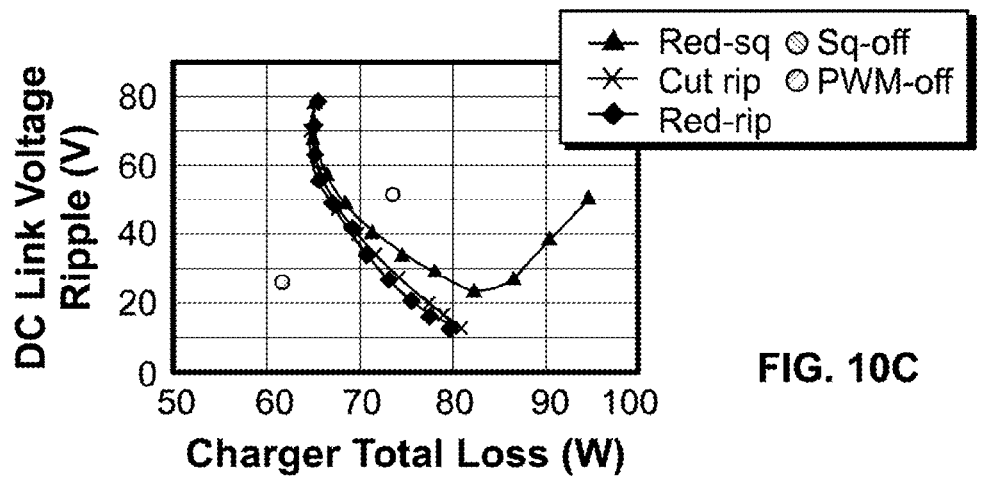
Figure 11A:
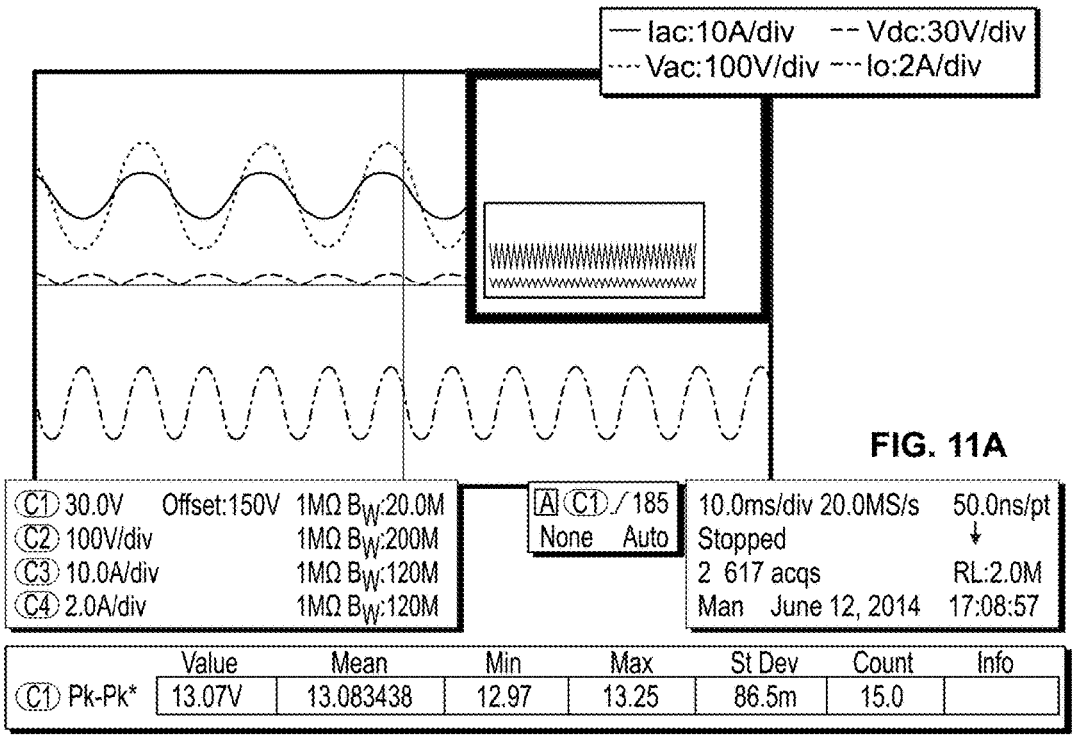
FIGS. 11A and 11B illustrate GaN charger testing results at 150V battery voltage and 300 W output power for several embodiments of the present invention. (A) Reduced-ripple charging. (B) PWM-off charging. The ripple voltage was kept the same (around 13V) in two cases. Efficiency is measured by Yokogawa power analyzer.
Figure 11B:
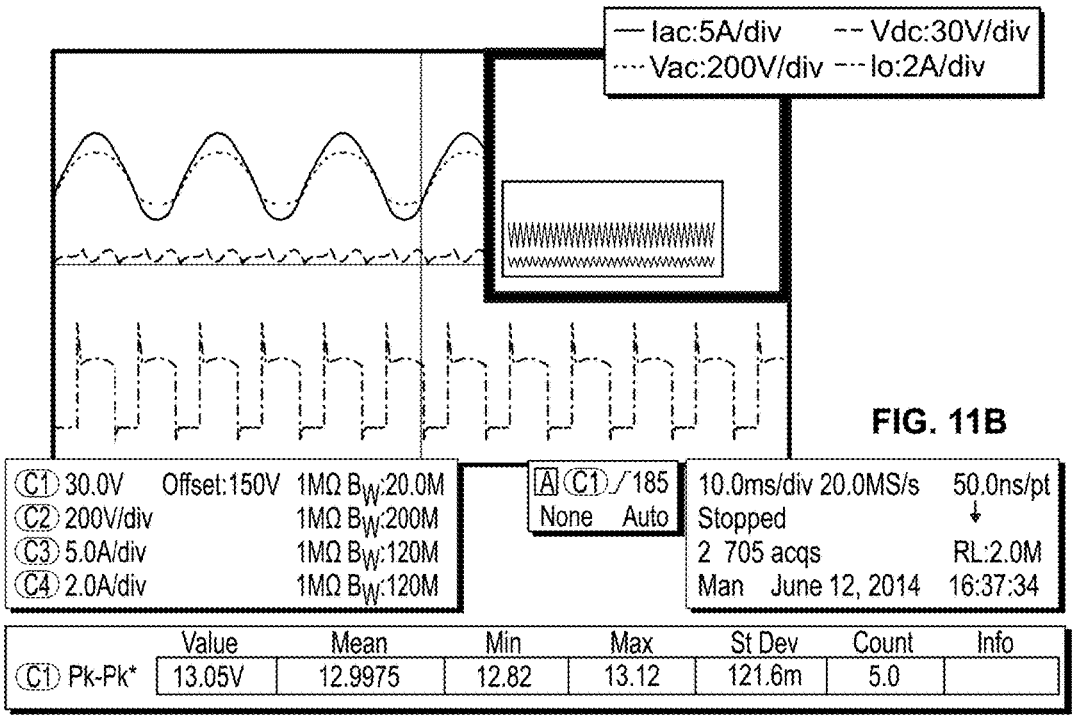

FIGS. 10A-10C demonstrate that the top two performing charging schemes are PWM-off and reduced-ripple charging, therefore these two methods were tested on the GaN charger. In the two tests, the DC link voltage ripple was kept the same (around 13V), then the converter losses were measured. It can be seen that PWM-off charging saved almost 39% of the loss, boosting the converter efficiency by 2.3%. In comparison with DC charging, the required DC link capacitance to achieve 13 V ripple can be estimated by (3) as 408 μF, which means PWM-off-charging achieves 75% reduction on DC link capacitance.

Figure 12:
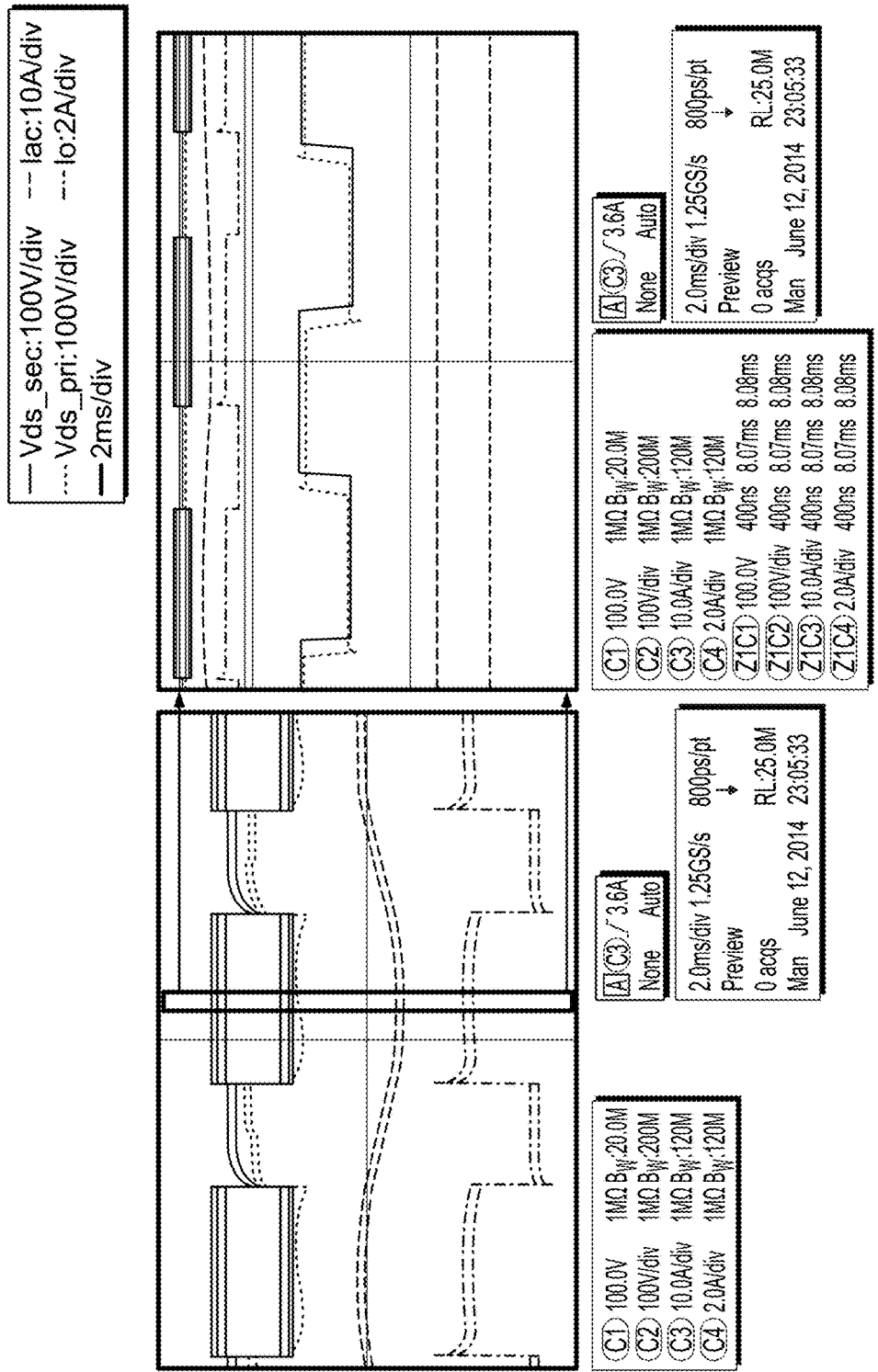
FIG. 12 shows GaN charger waveforms with PWM-off charging. Middle figure is the zoomed-in waveform of the left figure. A GaN charger prototype is shown at the right.

FIG. 12 shows the testing waveforms of the drain-to-source voltages of GaN switches: one from primary side of the transformer, the other one from secondary side. It can be seen from the zoomed-in waveform, that ZVS is achieved at the top of the PWM-off charging current.

PWM-off charging can reduce charger loss by 21% at Vb=120V, and by 37% at Vb=180V, compared to reduced-ripple sinusoidal charging.

Figure 15A:
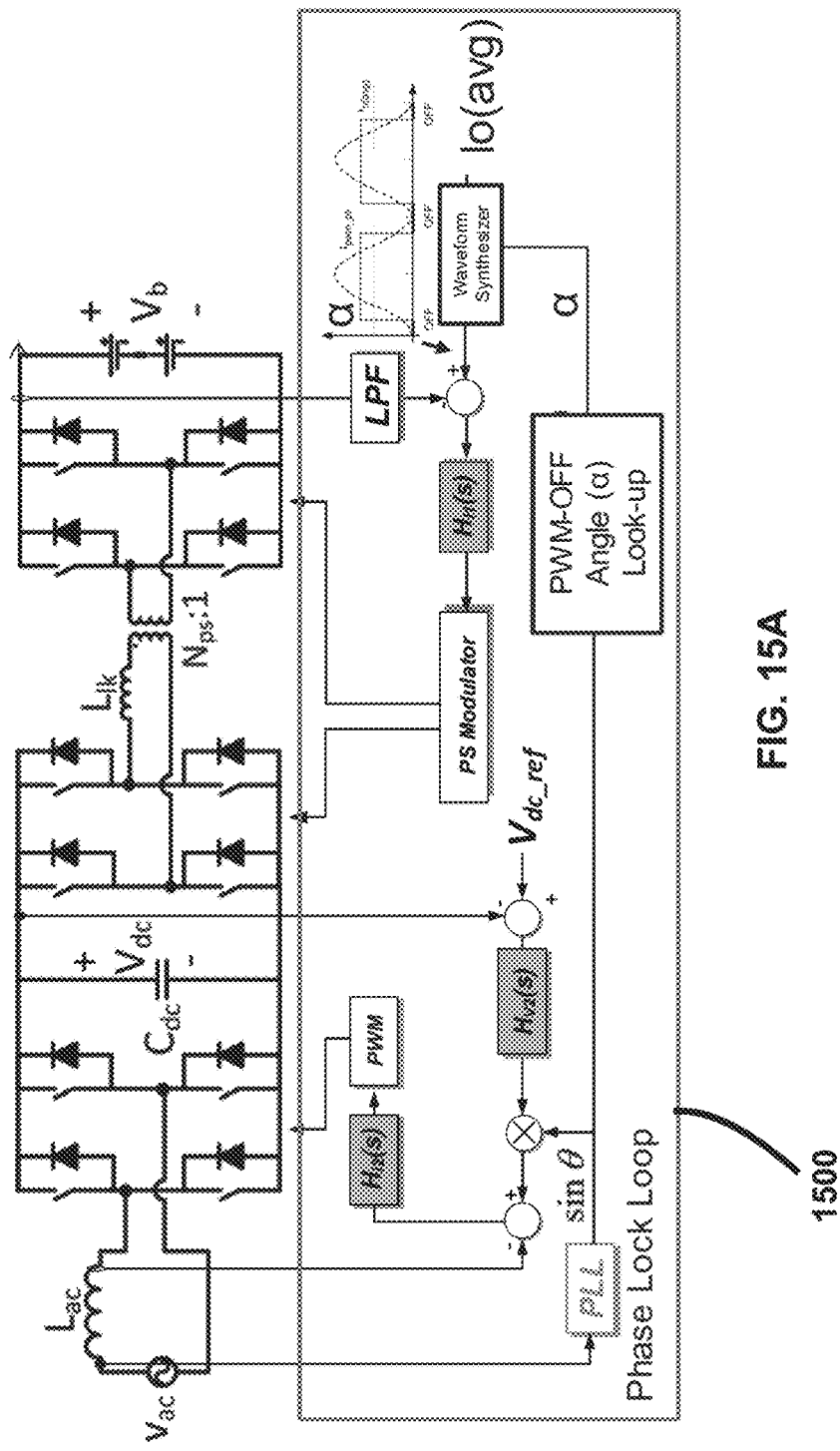
FIG. 15A shows an interface circuit for providing a waveform as the AC source for an embodiment of the present invention.
Figure 15B:
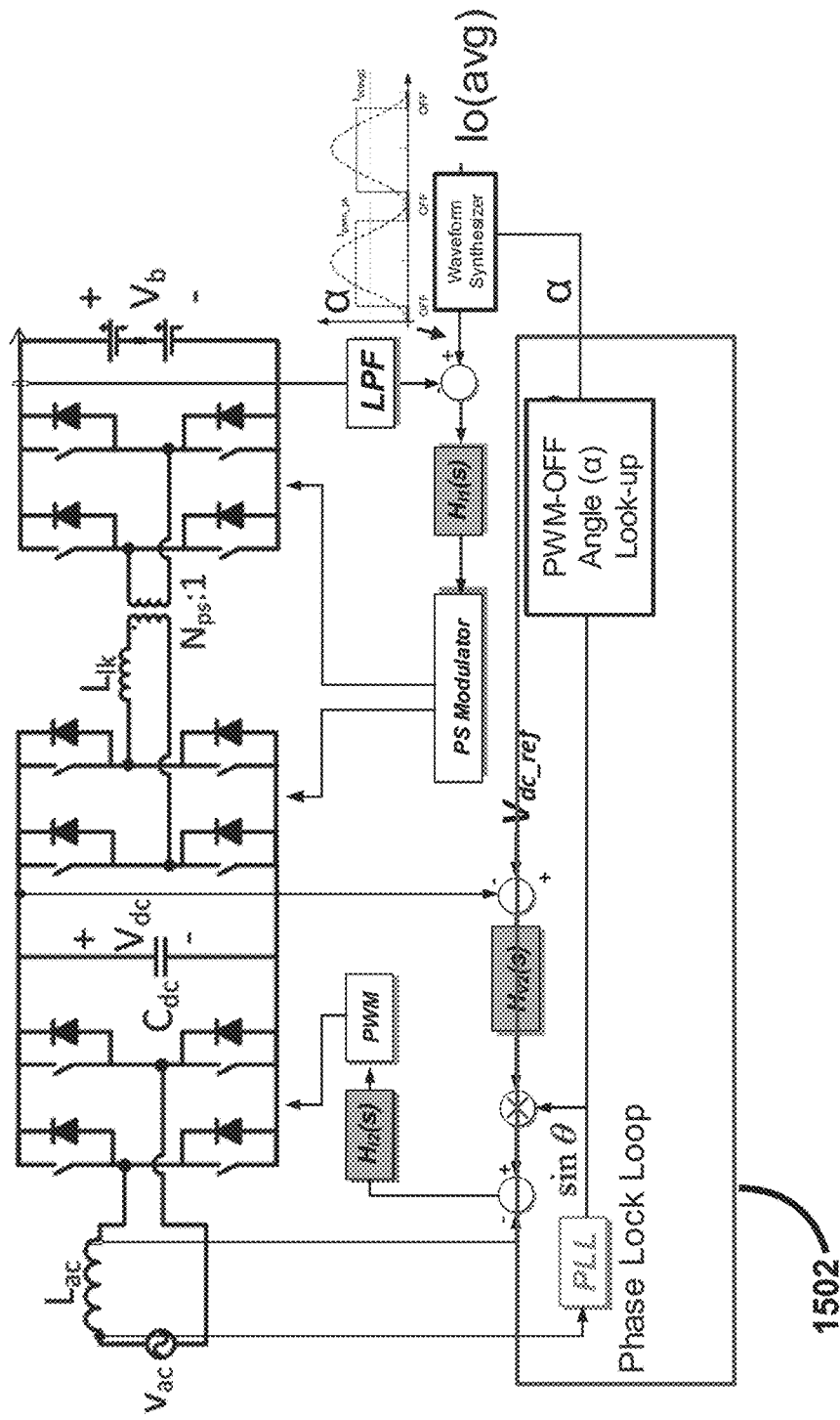
FIG. 15B shows an interface circuit comprising a modulation circuit for providing a waveform as the AC source for an embodiment of the present invention.

In other embodiments, the present invention provides a battery charger including a power converter for outputting a DC voltage. The charger includes a Full Bridge (FB) AC-DC switching circuit comprising a first plurality of switches for receiving an AC source and a DC link capacitor, the first plurality of switches provide an AC source component signal at double line frequency to the DC link capacitor. The Dual Active Bridge (DAB) converter includes at least one second switching circuit including a second plurality of switches. An interface circuit 1500, which may be a modulation circuit 1502, is also provided for receiving a waveform responsive to the AC source for driving one or more of the second plurality of switches of the second switching circuit for a reduced DAB converter loss with a reduced DC link capacitor as shown in FIGS. 15A and 15B. A transformer for receiving power from the DC link capacitor may also be used. The second plurality of switches are capable of providing DC voltage regulation with power to a primary winding of the transformer. The charger may also use a connection between the second switching circuit with the second plurality of switches from the transformer for outputting regulated DC voltage from a secondary winding of the transformer.

In other aspects, the capacitance of the DC link capacitor is reduced in relation to an increased efficiency of the DAB converter based on the waveform from the modulation circuit. The interface circuit may comprise a modulation circuit providing the waveform as the AC source. The modulation circuit may also provide the waveform as a Pulse Width Modulation (PWM), a reduced-ripple sinusoidal, cut-ripple sinusoidal, reduced-ripple square wave charging, or a square-wave-zero-off control signal, or combinations thereof.

The Pulse Width Modulation (PWM), reduced-ripple sinusoidal, cut-ripple sinusoidal, reduced-ripple square wave charging, or square-wave-zero-off circuit provides driving pulses to drive one or more of the second plurality of switches of at least the second switching circuit at a duty cycle for a reduced DAB converter loss with a reduced DC link capacitor.

In other aspects, the Pulse Width Modulation (PWM) zero-off charging circuit provides driving pulses to drive one or more of the second plurality of switches at a duty cycle for a reduced DAB converter loss with a reduced DC link capacitor, to turn off the second switching circuit when the DAB converter is not delivering power to avoid hard switching. The PWM duty cycle may be approximately 63%.

Figure 13:
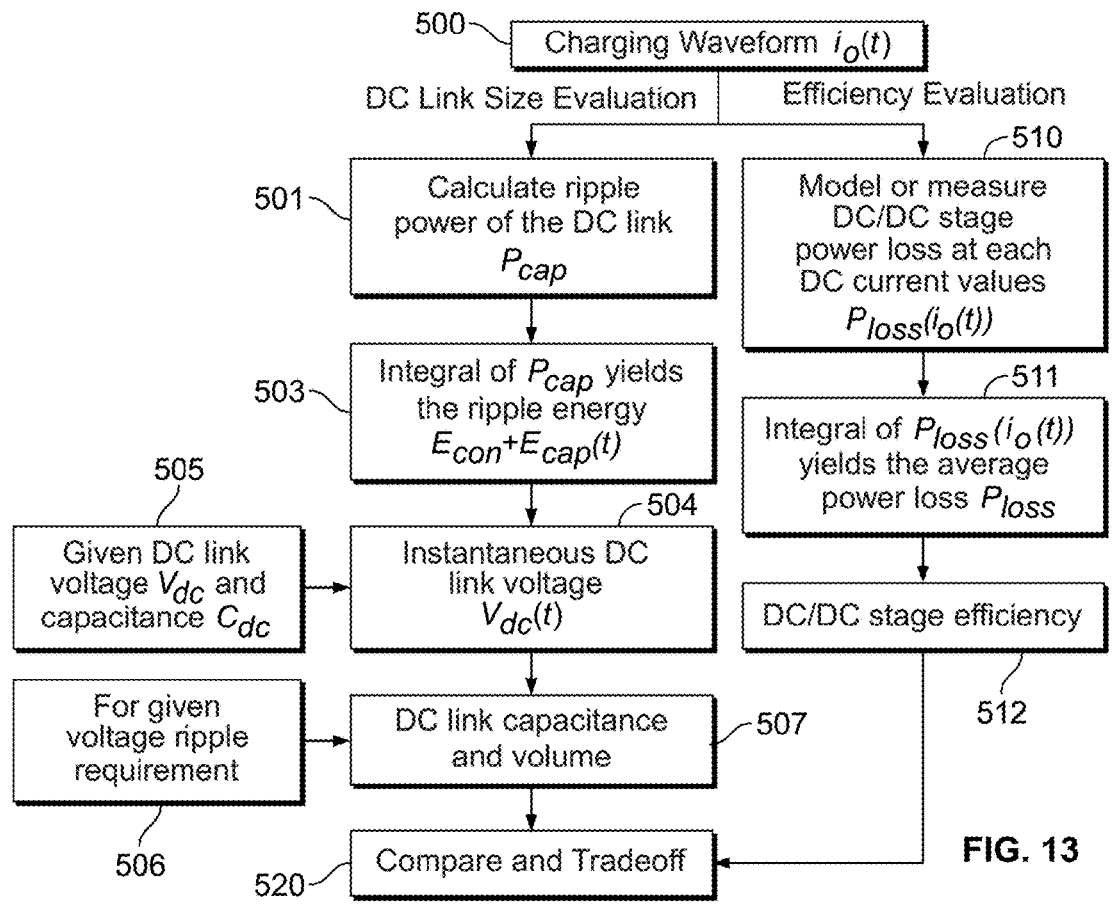
FIG. 13 shows a methodology to evaluate charging waveforms.

In other embodiments, the present invention provides a battery charging method controlled with a charging waveform input of an AC-DC switching circuit to a DC link and a DC-DC stage converter for outputting a regulated DC voltage. A preferred method for determining the charging waveform (500) may comprise the steps shown in FIG. 13.

For the DC link evaluation, the instantaneous DC link voltage based on a DC link voltage and a DC link capacitance may be evaluated by defining a voltage ripple requirement and determining at least one DC link volume area from the ripple power area and the ripple energy area for the defined voltage ripple requirement at the DC link capacitance. In a preferred embodiment, the method includes calculating ripple power of the DC link $P_{cap}$ (501). The integral of $P_{cap}$ yields the ripple energy $E_{con}+E_{cap}(t)$ (503). Determining an instantaneous DC link voltage $v_{dc}(t)$ by evaluating an instantaneous DC link voltage based on a DC link voltage and a DC link capacitance and defining a voltage ripple requirement (504-507).

Efficiency evaluation is performed by calculating an average power loss for the identified DC current value for a DC-DC stage efficiency to determine the modulation defining the charging waveform for reduced DC link capacitance and increased DC-DC stage converter efficiency. A preferred method includes creating a model or measure of the DC/DC stage power loss at each DC current values $p_{loss}(i_o(t))$ (510). The integral of $p_{loss}(i_o(t))$ yields the average power loss $P_{loss}$ (511).

The battery charging method also includes evaluating the DC-DC stage efficiency and comparing the DC-DC stage efficiency to trade off with the DC link size from the evaluated DC link capacitance and volume, evaluating different charging current waveforms in terms of DC link capacitance requirements and power conversion efficiency for an optimal charging modulation defining the charging waveform with reduced DC link capacitance and increased DC-DC stage converter efficiency.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A battery charger including a power converter for outputting a DC voltage, comprising:
 a Full Bridge (FB) AC-DC switching circuit comprising a first plurality of switches for receiving an AC source and a DC link capacitor, the first plurality of switches providing an AC source component signal at double line frequency to the DC link capacitor;
 a Dual Active Bridge (DAB) converter comprising second switching circuits including a second plurality of switches; and
 an interface circuit for receiving a waveform responsive to the AC source for driving one or more of the second plurality of switches of at least said second switching circuit for a reduced DAB converter loss with a reduced DC link capacitor;
 said interface circuit comprises a modulation circuit;
 said modulation circuit provides the waveform as the AC source and further comprises a Pulse Width Modulation (PWM) zero-off charging circuit for providing driving pulses to drive one or more of the second plurality of switches at a duty cycle for a reduced DAB convertor loss with a reduced DC link capacitor, to turn off said second switching circuit when the DAB convertor is not delivering power to avoid hard switching; and
 wherein the capacitance of the DC link capacitor is reduced in relation to an increased efficiency of the DAB convertor based on the waveform from the modulation circuit.

2. The battery charger recited in claim 1, comprising a transformer receiving power from the DC link capacitor, the second plurality of switches capable of providing DC voltage regulation with power to a primary winding of the transformer.

3. The battery charger recited in claim 2, comprising a connection between said second switching circuit with the second plurality of switches from the transformer for outputting regulated DC voltage from a secondary winding of the transformer.

4. The battery charger recited in claim 1, wherein the modulation circuit providing the waveform is a Pulse Width Modulation (PWM) control signal.

5. The battery charger recited in claim 1, wherein the modulation circuit comprises a Pulse Width Modulation (PWM) circuit for providing driving pulses to drive one or more of the second plurality of switches of at least said second switching circuit at a duty cycle for a reduced DAB converter loss with a reduced DC link capacitor.

6. The battery charger recited in claim 1, wherein the optimal charging PWM duty cycle is approximately 63%.

* * * * *